F. T. CUMMINGS.
KETTLE.
APPLICATION FILED DEC. 15, 1910.
989,125.
Patented Apr 11, 1911.
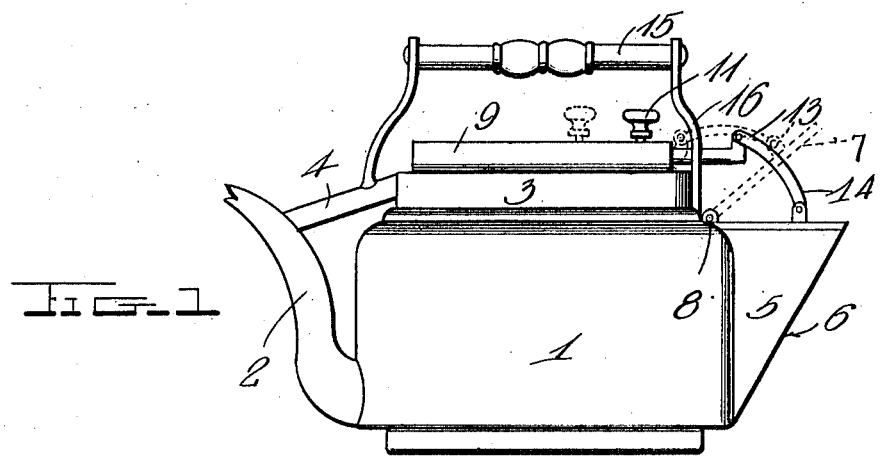
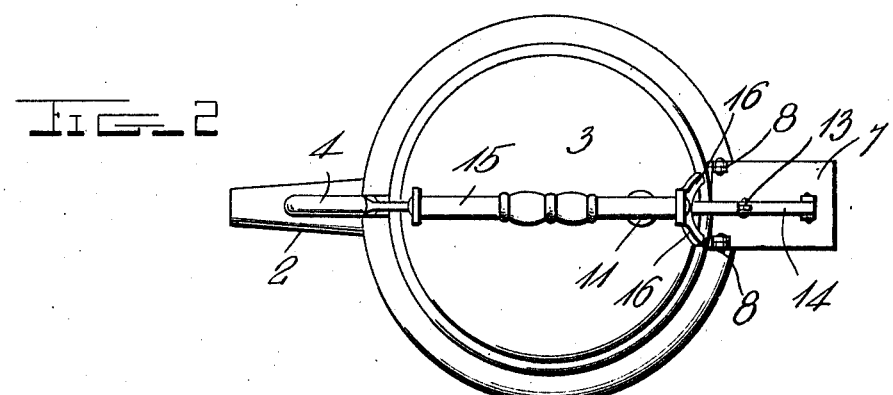
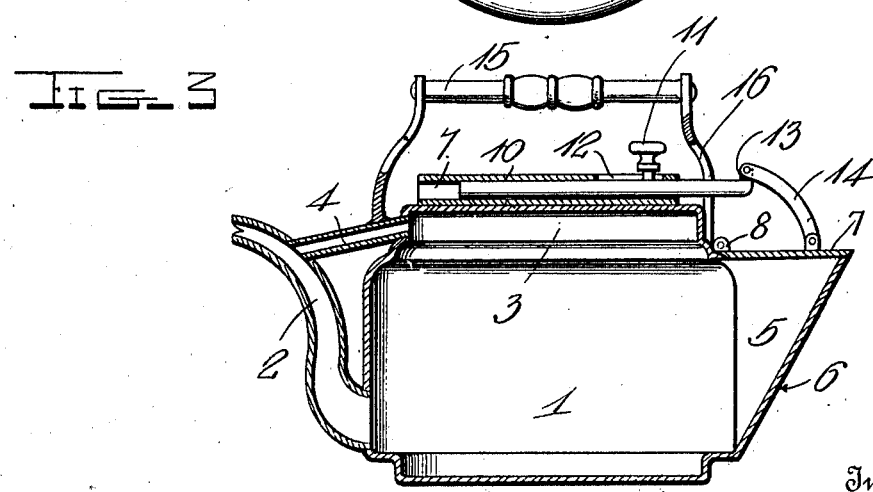
Witnesses
O. B. Hopkins
Inventor
Ferdinand T. Cummings
by H. B. Willson & Co.
Attorneys

UNITED STATES PATENT OFFICE.

FERDNAND T. CUMMINGS, OF ORLANDO, FLORIDA.

KETTLE.

989,125.　　　Specification of Letters Patent.　　Patented Apr. 11, 1911.

Application filed December 15, 1910. Serial No. 597,395.

*To all whom it may concern:*

Be it known that I, FERDNAND T. CUMMINGS, a citizen of the United States, residing at Orlando, in the county of Orange and State of Florida, have invented certain new and useful Improvements in Kettles; and I do declare the following to be a full, clear, and exact description of the invention, such as will enable others skilled in the art to which it appertains to make and use the same.

This invention relates to improvements in tea kettles.

One object of the invention is to provide a kettle having an improved construction and arrangement of cover and means for opening and closing the same whereby the steam is prevented from escaping and scalding the hands when pouring water from the kettle.

Another object is to provide means for conducting the steam from the dome or top of the kettle to the discharge spout thereof.

With these and other objects in view the invention consists of certain novel features of construction, combination and arrangement of parts as will be more fully described and particularly pointed out in the appended claims.

In the accompanying drawings: Figure 1 is a side view of a tea kettle constructed in accordance with the invention showing the cover in closed position in full lines and in open position in dotted lines; Fig. 2 is a top plan view of the kettle; Fig. 3 is a central vertical section of the same.

Referring more particularly to the drawings, 1 denotes the body portion of my improved tea kettle having on one side the usual spout 2 and on its upper end a steam dome 3. The dome 3 is connected at the front end of the kettle to the spout 2 by a steam conducting tube 4 whereby the steam from the dome or upper portion of the kettle is conducted to the spout 2 and thereby discharged from the kettle.

Arranged in the rear end of the kettle directly opposite the discharge spout is a filling extension 5 the rear wall 6 of which is preferably formed on an angle or incline as shown. The upper end of the extension 5 is closed by a cover 7 hinged at its inner end to the rear side of the kettle as shown at 8. Arranged on the dome 3 of the kettle is a longitudinally disposed guide tube 9 in which is slidably mounted a cover operating rod 10 having an operating knob 11 which projects through and works in a slot 12 formed in the upper side of the guide tube 9. On the rear end of the guide rod 10 is formed a lug 13 to which is connected the upper end of a curved link 14 the lower end of which is pivotally connected to the cover 7 of the filling extension 6. By thus connecting the cover with the operating rod 10, said cover may be opened and closed by shifting said rod forwardly and rearwardly in the guide tube 9 by means of the operating knob 11.

The kettle 1 is provided with a handle 15 the forward end of which is preferably connected to the steam conducting tube 4 while the rear end 16 is bifurcated and straddles the rear end of the guide tube 9 and is connected to the upper rear portion of the kettle as shown.

By constructing and arranging the filling opening of the kettle and providing a cover for the same as herein shown and described the danger of steam escaping and scalding the person using the kettle when pouring water therefrom or when filling the same will be entirely prevented as when pouring water from the kettle the cover 7 may be held tightly closed by the engagement of the little finger with the knob 11 of the cover operating rod 10 when the handle of the kettle is gripped. By providing the steam conducting pipe 4 through which steam is conducted from the dome 3 to the spout of the kettle, the pressure of the steam from this part of the kettle is removed and prevented from rushing out or forcibly exhausting from the filling extension when the cover thereof is opened for filling the kettle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A tea kettle provided with a spout and having formed on the rear side of the kettle opposite to the spout a filling extension, a cover adapted to open and close said extension, a guide tube arranged on the top of the kettle, a cover-operating rod slidably mounted in said tube, an operating knob arranged on said rod, a link to connect the outer end of the rod with said cover whereby when said rod is shifted the cover will be opened and closed, and whereby the cover may be held in a closed position when the kettle is being used.

2. A tea kettle provided with a spout and having on its upper end, a steam dome, a steam-conducting tube to connect said dome with the spout, a filling extension arranged on the rear side of the kettle, a cover hinged to the kettle and adapted to open and close said extension, a guide tube arranged on the upper end of the kettle, said tube having formed therein a guide slot, a cover-operating rod slidably engaged with said tube, said rod having a lug formed on its outer end, a link pivotally connected at one end to said lug and at its opposite end to said cover whereby when said rod is shifted back and forth in said guide tube the cover of said extension will be opened and closed, an operating knob arranged on said rod, and a handle arranged on the kettle whereby when said handle is gripped, said knob may be engaged and the cover of the filling extension held in a closed position while the kettle is being used.

In testimony whereof I have hereunto set my hand in presence of two subscribing witnesses.

FERDNAND T. CUMMINGS.

Witnesses:
W. W. WRIGHT,
S. E. IVES, Jr.

Copies of this patent may be obtained for five cents each, by addressing the "Commissioner of Patents, Washington, D. C."